Jan. 12, 1954
N. C. WELLS
2,665,644
WELL PUMP FILTER
Filed Jan. 25, 1952
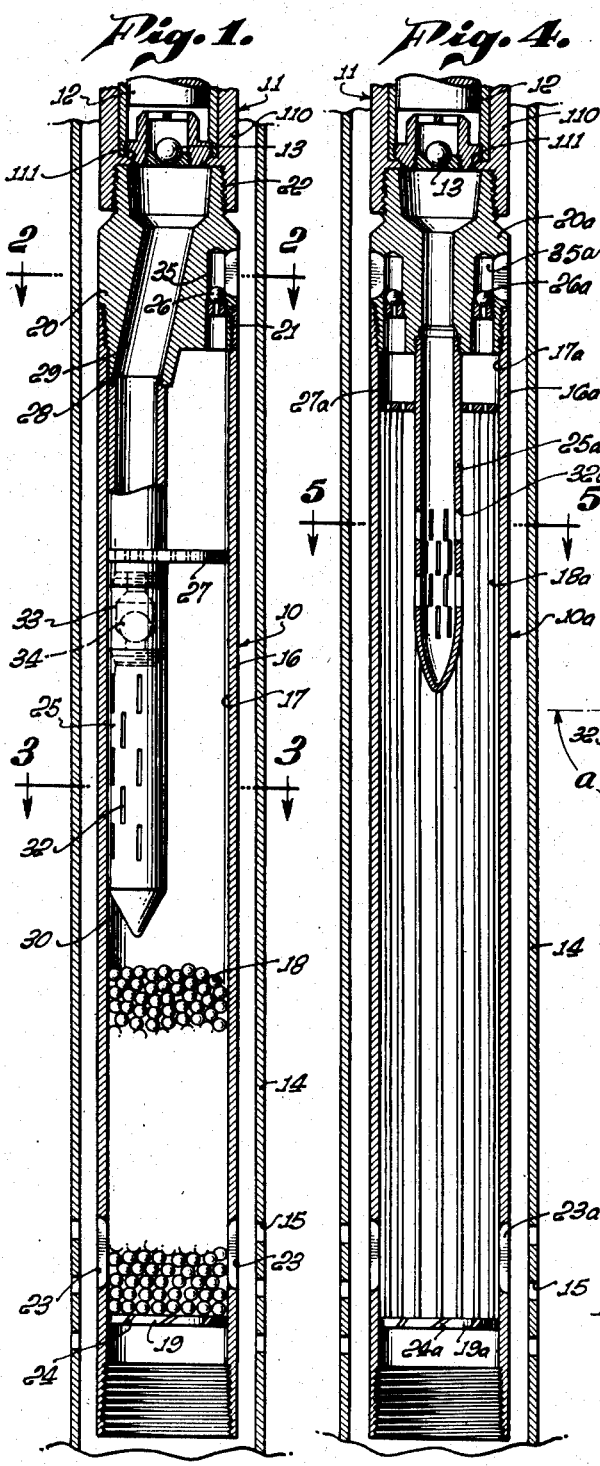
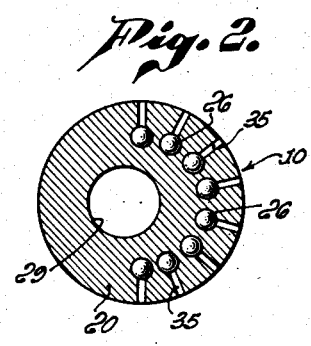
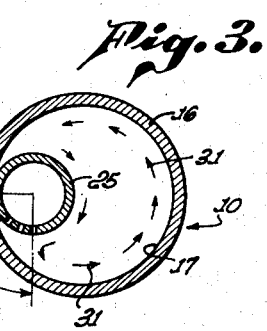
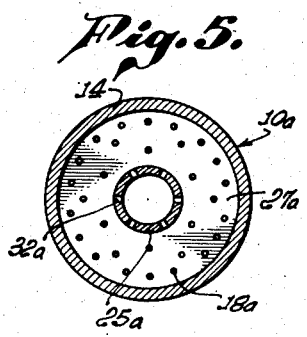
NORMAN C. WELLS,
INVENTOR.
BY *H Calvin White*
ATTORNEY.

Patented Jan. 12, 1954

2,665,644

UNITED STATES PATENT OFFICE 2,665,644

WELL PUMP FILTER

Norman C. Wells, Long Beach, Calif., assignor to Agate Corporation, Los Angeles, Calif., a corporation of California Application January 25, 1952, Serial No. 268,258

9 Claims. (Cl. 103—203)

This invention relates to improved well pump filter attachments adapted to separate gases from well liquid flowing to a pump, and preferably also functioning to control the passage of sand to the pump. In certain of its aspects, the invention is directed to improvements in the type of filter device shown in Patent No. 2,525,897 issued to Haskell M. Greene on Well Pipe Filters, and in Mr. Greene's application Ser. No. 207,627, entitled Well Pump Filter Attachments, filed January 24, 1951. Some features of the filters herein disclosed are also shown and claimed in my copending application Ser. No. 268,259, on Well Pump Gas and Sand Control Filters, filed on even date herewith.

The present filters are of a type including a body attachable to the bottom of a well pump, and filter means within a chamber in the body acting to separate gases from the liquid flowing to the pump. The body of the device contains separate liquid and gas outlets, directing the liquid upwardly to the pump and the separated gases back into the well.

The separation of gases in these devices is greatly enhanced by at all times maintaining a column of separated but unexpelled gases in the filter chamber above the well liquid. As will be appreciated, the gases in the liquid are able to escape considerably more freely when given the opportunity to pass into such an upper column of already separated gases, than in the absence of such a gas column.

For maintaining this gas column in the tool, I provide valve means in the gas outlet passage offering sufficient resistance to the discharge of gases to prevent their complete release at any time. Preferably, I employ for this purpose one or more gas discharge check valves, mounted in an upper portion of the body, and loaded to an extent maintaining the desired gas column.

Prior filter devices of the present type have had certain disadvantages which have prevented the delivery of a sufficiently gas-free liquid to the pump. In particular, though the filter elements in these prior devices have been capable of initially separating gases from the well liquid, the devices have not been so constructed as to then maintain separation of the liquid and gas as they are discharged to the pump and well respectively. Rather, some of the initially separated gases have usually been permitted to reunite with the liquid before its delivery to the pump, and consequently the advantages of the initial separation have to a certain extent been lost.

A major object of the present invention is to provide a well pump filter attachment adapted to not only initially separate gases from the well liquid, but also to then discharge the two fluids from the filter body in a manner positively preventing the flow of any of the separated gases to the pump. This result is achieved by a unique construction acting to at all times maintain a highly effective liquid seal about the entrance to a liquid outlet passage leading to the pump, and particularly between that outlet passage and the gas column in the upper portion of the filter chamber. This liquid seal then serves as a positive barrier preventing access of the accumulated gases at any time to the liquid outlet.

The liquid seal is very simply but effectively assured by merely predetermining the location of the liquid outlet and the loading of the gas discharge check valves. Specifically, the liquid outlet or outlets are formed to communicate with the chamber at only a location or locations spaced below the top of the chamber, and the gas discharge valves are then loaded sufficiently lightly to at all times maintain the liquid level in the chamber well above the liuqid outlets. The upper body of gases is thus continuously isolated from the liquid outlet and none of the gases can at any time flow to the pump.

In one form of the invention, I employ at a filtering or gas separating material a mobile and vertically displaceable mass of interengaging filter particles, preferably taking the form of glass spheres, as employed in the above mentioned Greene patent and application. In a second form of the invention, the filter material comprises a nest of elongated parallel vertically extending members or rods, along which the gases accumulate and flow upwardly to an upper gas collection portion of the filter chamber.

The above and other features of the present invention will be better understood from the following detailed description of the typical embodiments illustrated in the accompanying drawing, in which:

Fig. 1 is a vertical sectional view through a well pump filter attachment embodying the invention;

Fig. 2 is an enlarged horizontal section through the upper fluid discharging head of the device, taken on line 2—2 of Fig. 1;

Fig. 3 is an enlarged horizontal section taken on line 3—3 of Fig. 1;

Fig. 4 is a vertical sectional view of a variational form of the invention; and

Fig. 5 is an enlarged horizontal section taken on line 5—5 of Fig. 4.

In Fig. 1, a first form of filter 10 embodying the invention is shown connected to the lower end of a production string containing a conventional well pump 11. The pump, which is only partially illustrated seats downwardly against an annular seat 111 within the string 110, and includes the usual vertically reciprocating piston 12, and a lower fluid inlet check valve 13. The pump and filter device are shown positioned within a well casing 14, containing perforations 15 through which well fluid may flow from the formation surrounding the casing into the well. The casing 14 normally contains a hydrostatic column of the well liquid extending upwardly to a location high above the pump.

The filter device 10 includes a tubular vertically extending main body section 16, which serves as the side wall of an inner filter chamber 17, containing the filter mass 18. The lower end of chamber 17 is defined by a bottom wall or partition 19 extending transversely across main body section 16; and the upper end of the chamber is defined by an upper head 20, threadedly connected to body section 16 at 21, and to the pump at 22. Liquid and gaseous well fluid enters the lower portion of the filter chamber through side and bottom inlets 23 and 24. After the separation of liquid and gas within the chamber, the liquid leaves the chamber through outlet tube 25 leading to the pump, and the separated gases are discharged to the exterior of the filter body past check valves 26 in head 20.

Side inlets 23 are formed as a number of vertically elongated circularly spaced fluid passing slots in the lower portion of tubular body section 16. Bottom inlets 24 comprise a number of circularly spaced slots formed in, and extending radially outwardly from near the center of, chamber bottom wall 19. The inlets 23 and 24 all extend angularly through the chamber walls in which they are formed, to direct the incoming well fluid generally tangentially into chamber 17, and cause a circular and upwardly spiraling motion of the well fluid in the chamber.

The filter material 18 is initially received within the lower portion of chamber 17, and comprises a mobile and vertically displaceable mass of discrete and interengaging filter particles. For best results, these filter particles should take the form of glass spheres, preferably of a diameter between about $\frac{1}{8}$ inch and $\frac{1}{2}$ inch. Upon each upstroke of the pump piston, the resulting circular and upwardly spiraling flow of well fluid within chamber 17 causes a corresponding circular and upwardly spiraling motion of the filter particles or spheres, as well as a spinning motion of the spheres about their individual axes. Such upward spiraling motion of the spheres is limited by their engagement with a perforated transverse partition 27 received between liquid outlet tube 25 and chamber side wall 16 at a location spaced beneath the top of the chamber.

As the well fluid flows upwardly through the filter mass 18, contact of the fluid with the filter particles causes separation of the gases from the well liquid, which separation is greatly enhanced by the violent spiraling and spinning motions of the particles. At the same time, the filter mass acts to control the amounts of sand and other entrained particles flowing to the pump with the well liquid. More particularly, the filter mass prevents passage to the pump at any time of sudden charges of sand or the like in quantities sufficient to materially damage the pump, but instead passes these solid materials to the pump at a relatively uniform and safe rate. When the flow of solid particles is thus regularized, these particles can be maintained in suspension within the well liquid during their entire passage through the pump, and the usual damage to the pump is avoided.

The liquid discharge tube 25 is threadedly connected to the underside of head 20 at 28, and communicates with passage 29 in the head leading upwardly to the pump. Tube 25 projects downwardly into chamber 17, and terminates in a tapered and closed lower end 30 located a short distance above the filter mass in its condition of repose. In order to provide a liquid and filter particle flow area of maximum horizontal dimension at one side of tube 25, the tube is positioned at a location offset horizontally from the center of chamber 17. Preferably, tube 25 is located directly against a side of the chamber, so that the upwardly spiraling fluid and filter particles may follow the extended and relatively free course represented by the arrows 31 in Fig. 3.

The well liquid enters liquid outlet tube 25 through a number of apertures 32 formed in the wall of the tube. The uppermost of these apertures is spaced a substantial distance below the gas outlet valves 26, so that the imperforate upper portion of tube 25 forms with head 20 and main body section 16 an enclosed upper gas receiving space.

In order to minimize the chances that any gases will flow with the liquid into the liquid outlet tube, the apertures 32 in that tube are so positioned as to take liquid from only the most calm and undisturbed portion of the chamber 17. Specifically, these apertures are located at a side of tube 25 which is down stream with respect to the circular course of fluid and filter particle flow within the chamber. Preferably, these apertures are formed in only the most removed portion of even that downstream side of the tube, specifically in an approximately 90° portion thereof nearest the body side wall and designated at "a" in Fig. 3.

To assure the delivery of a relatively dead body of liquid to the pump upon each upstroke, I preferably connect into the liquid outlet tube 25 a check valve unit 33. This unit includes a ball check valve element 34 adapted to pass liquid upwardly to the pump during its upstroke, but to prevent the downward flow of any of the liquid during the pump downstroke. For best results, the check valve unit should be connected into the outlet tube at a location directly above the uppermost tube aperture 32.

The separated gases escape from the upper portion of the chamber through a number of passages 35 in the head, each of which extends first upwardly from the top of the chamber and then laterally to the outside of the device. There may typically be eight of these passages, as shown, at locations spaced about a semi-circular extent of the head opposite the portion of the head from which liquid outlet tube 25 depends. A check valve 26 is positioned within the upwardly extending portion of each passage 35, to prevent reverse or inward fluid flow, and to regulate the outward flow.

Predetermination of the degree of loading of check valves 26, preferably by merely controlling their weights and their areas subjected to pressure, is extremely important in assuring most effective gas separation in the present device. For one thing, these check valves are so designed as to resist opening movement to an extent at all times maintaining a body of unexpelled gas in the upper portion of the chamber. The presence such a gas column above the liquid creates a liquid-gas interface in the chamber, which in accordance with known principles encourages a continuing separation of gas from the liquid.

The loading of check valves 26 is important also for controlling the liquid level within the filter chamber, in a manner preventing discharge of any gases to the pump with the well liquid. Specifically, the check valves are loaded sufficiently lightly to under all circumstances maintain the liquid level in the chamber above the uppermost one of the liquid outlet apertures 32. In this way, a highly effective liquid seal is provided at the liquid outlets, positively preventing access of any of the separated gases to those outlets.

With specific reference to the manner in which check valves 26 control the liquid level in the chamber, it is noted that as gases accumulate in the upper portion of the chamber an unbalanced condition is set up between the hydrostatic columns at the inside and outside of the filter body. This unbalanced condition evidences itself in the exertion of a differential pressure tending to open check valves 26. As will be understood, this differential pressure is caused by the weight of an unbalanced portion of the outer liquid column horizontally opposite and corresponding in height to the inner gas column. The value of this differential pressure exerted against the valve may be calculated for any particular height of gas column from the following formula, assuming the weight of the inner gas column to be negligible:

$$P = H \times D$$

Where, $P$ = differential pressure in pounds per square inch.
$H$ = height of gas column in feet.
$D$ = density of fluid in outer liquid column in pounds per square inch per foot.

In designing a particular filter, it is necessary to so select the check valves and to so position the liquid outlets that the differential hydrostatic pressure, as calculated from the above formula, will reach a sufficient value to open the valves before the liquid level has fallen to the liquid outlet location. Stated differently, if both the maximum liquid density likely to be encountered and the check valve opening pressures are known, the minimum permissible spacing "X" of liquid outlets 32 beneath the gas escape valves may be calculated from the following formula:

$$L = \frac{P}{D} \times 12$$

Where, $L$ = minimum permissible distance "X" in inches from uppermost liquid discharge aperture 32 to gas outlet valve seat.
$D$ = density of lightest fluid likely to be encountered in annulus outside of filter body, in lbs. per sq. in. per ft. This lightest density likely to be encountered is about 0.06 lb. per sq. in. per ft., the density of oil and gas froth. The heaviest fluid encountered is salt water which has a density of about .46 lb. per sq. in. per ft.

In a typical filter device which has proven extremely effective in very gassy wells, the various parts have the following proportions and characteristics:

1. Chamber diameter = 4½".
2. Vertical distance X between seats of gas escape check valves 26 and uppermost liquid outlet aperture = 38".
3. Vertical distance between check valves 26 and liquid level at which check valves are opened by hydrostatic pressure = 4½".
4. Pressure at which check valves open = .16 lb./sq. in.

In using the device of Figs. 1–3, the pump piston is reciprocated in the usual manner, to cause intermittent surges of liquid and gaseous well fluid upwardly into the filter chamber and toward the pump. Inlets 24 and 25 direct the incoming fluid in upwardly spiraling paths within the chamber, to cause a corresponding upwardly spiralling motion of the filter spheres. Passage of the fluid through the sphere mass separates the gases from the well liquid, and regularizes the flow of sand to the pump. The separated gases rise upwardly for discharge past check valves 26, which function in the manner previously discussed to maintain both a gas column in the chamber and a liquid seal at the liquid outlets. The relatively gas-free liquid flows into tube 25 and to the pump.

Figs. 4 and 5 illustrate a variational form of filter 10a, which is similar in many respects to that of Fig. 1 but employs a different type of filtering element. As in Fig. 1, the body of the device comprises a main tubular body section 16a containing a chamber 17a, whose upper and lower ends are defined by head 20a and bottom wall 19a respectively. Liquid and gaseous well fluid is directed in a circular and upwardly spiraling course within chamber 17a by angular inlets 23a and 24a at the bottom of the chamber. The liquid leaves the chamber through a liquid outlet tube 25a, which in this case is shown to be projecting downwardly at the center of the filter chamber.

The filter elements in this second form of device comprise a number of spaced parallel smooth surfaced rods 18a extending vertically between bottom wall 19a of the chamber and a transverse perforated plate 27a carried about tube 25a near the upper end of the filter chamber. For retaining the rods in fixed positions, the upper and lower ends of the rods may be frictionally retained within specially formed openings in plate 27a and bottom wall 19a respectively.

Rods 18a act as contact bodies on which the well gases accumulate, and along which the accumulated gases travel upwardly to the enclosed gas receiving space at the upper end of chamber 17a. These gases discharge back into the well through passages 35a and past check valves 26a spaced circularly about head 20a. The check valves 26a are loaded or weighted as in Fig. 1, in a manner assuring the maintenance of a liquid column within the upper portion of chamber 17a, while at the same time maintaining the liquid level in the chamber at all times above the uppermost liquid outlet aperture 32a in liquid outlet tube 25a. Preferably, check valves 26a are also so designed as to maintain the liquid level at all times beneath plate 27a to which the upper ends of rods 18a are fastened. When plate 27a is thus positioned above the liquid level, the gases flowing upwardly along rods 18a are permitted to reach the upper column of gas without any interference by engagement with the plate. The apertures in plate 27a of course permit relatively free gas flow upwardly through the plate during the discharge of gases past check valves 26a.

In the operation of the Figs. 4 and 5 form of the invention, each upstroke of the pump piston creates an upwardly spiraling flow of well fluid within chamber 17a and through the nest of rods 18a. The rods act to separate gases from the well liquid in the manner previously described, and also tend to regularize the delivery of solid particles to the pump. The separated gases rise upwardly within chamber 17a for controlled discharge past check valve 26a, and the well liquid enters tube 25a for delivery upwardly to the pump.

I claim:

1. A well fluid separator comprising a body containing a chamber and adapted to be carried beneath a well pump, means forming an inlet admitting liquid and gaseous well fluid into said chamber, means within the body acting to separate gases from the well liquid, said chamber having an upper gas outlet means and spaced therebelow a liquid outlet communicable with the pump, the chamber being formed to maintain an enclosed and extended gas column above the surface of the liquid going to the outlet, and valve means imposing predetermined back pressure on the gas escape through said gas outlet means, said predetermined back pressure being sufficiently great to assure the maintenance of said gas column in the chamber, and being sufficiently small to maintain the liquid level in the chamber above said liquid outlet to thus assure the maintenance of a liquid seal at and against gas escape through said liquid outlet.

2. A well fluid separator comprising a body containing a chamber and adapted to be carried beneath a well pump, means forming an inlet admitting liquid and gaseous well fluid into said chamber, means within the body acting to separate gases from the well liquid, said chamber having an upper gas outlet means and spaced therebelow a liquid outlet communicable with the pump, the chamber being formed to maintain an enclosed and extended gas column above the surface of the liquid going to the outlet, and check valve means preventing fluid inflow through said gas outlet means and imposing predetermined back pressure on the gas escape through said gas outlet means, said predetermined back pressure being sufficiently great to assure the maintenance of said gas column in the chamber, and being sufficiently small to maintain the liquid level in the chamber above said liquid outlet to thus assure the maintenance of a liquid seal at and against gas escape through said liquid outlet.

3. A well pump filter device comprising a body containing a chamber and adapted to be carried beneath a well pump, means forming an inlet admitting liquid and gaseous well fluid into said chamber, a mobile mass of interengaging filter particles in the path of fluid flow through the chamber acting to separate gases from the well liquid and control the passage of sand through the chamber, said chamber having an upper gas outlet means and spaced therebelow a liquid outlet communicable with the pump, the chamber being formed to maintain an enclosed and extended gas column above the surface of the liquid going to the outlet, and valve means imposing predetermined back pressure on the gas escape through said gas outlet means, said predetermined back pressure being sufficiently great to assure the maintenance of said gas column in the chamber, and being sufficiently small to maintain the liquid level in the chamber above said liquid outlet to thus assure the maintenance of a liquid seal at and against gas escape through said liquid outlet.

4. A well pump filter device comprising a body containing a chamber and adapted to be carried beneath a well pump, a mobile and vertically displaceable mass of interengaging glass spheres in said chamber, said body containing an inlet positioned to direct liquid and gaseous well fluid upwardly through said mass of spheres and to cause by the fluid flow a corresponding upward displacement of the spheres, said spheres acting to separate gases from the well liquid and control the passage of sand through the chamber, said chamber having an upper gas outlet means and spaced therebelow a liquid outlet communicable with the pump, the chamber being formed to maintain an enclosed and extended gas column above the surface of the liquid going to the outlet, and check valve means preventing fluid inflow through said gas outlet means and imposing predetermined back pressure on the gas escape through said gas outlet means, said predetermined back pressure being sufficiently great to assure the maintenance of said gas column in the chamber, and being sufficiently small to maintain the liquid level in the chamber above said liquid outlet to thus assure the maintenance of a liquid seal at and against gas escape through said liquid outlet.

5. A well fluid separator comprising a body containing a chamber and adapted to be carried beneath a well pump, a number of elongated vertically extending elements in the chamber acting to promote separation of gases from the well liquid, said chamber having an upper gas outlet means and spaced therebelow a liquid outlet communicable with the pump, the chamber being formed to maintain an enclosed and extended gas column above the surface of the liquid going to the outlet, and valve means imposing predetermined back pressure on the gas escape through said gas outlet means, said predetermined back pressure being sufficiently great to assure the maintenance of said gas column in the chamber, and being sufficiently small to maintain the liquid level in the chamber above said liquid outlet to thus assure the maintenance of a liquid seal at and against gas escape through said liquid outlet.

6. A well fluid separator comprising a body containing a chamber and adapted to be carried beneath a well pump, a nest of elongated closely spaced vertically extending rods in the chamber acting to promote separation of gases from the well liquid, said chamber having an upper gas outlet means and spaced therebelow a liquid outlet communicable with the pump, the chamber being formed to maintain an enclosed and extended gas column above the surface of the liquid going to the outlet, and check valve means preventing fluid inflow through said gas outlet means and imposing predetermined back pressure on the gas escape through said gas outlet means, said predetermined back pressure being sufficiently great to assure the maintenance of said gas column in the chamber, and being sufficiently small to maintain the liquid level in the chamber above said liquid outlet to thus assure the maintenance of a liquid seal at and against gas escape through said liquid outlet.

7. A well pump filter device comprising a tubular body containing a vertically extending chamber and adapted to be carried beneath a well pump, said body containing an inlet admitting liquid and gaseous well fluid into a lower portion of the chamber, means within the chamber acting to separate gases from the well liquid, a liquid outlet tube extending downwardly into said chamber from the upper end thereof, said tube containing a liquid discharge passage leading to said pump and communicating with the chamber at a predetermined location spaced beneath the top of the chamber, the wall of said tube being imperforate above said location, gas outlet means for separately discharging gases from an upper portion of the chamber above said location to the outside of the body, and check valve means preventing fluid inflow through said outlet means and resisting the gas discharge to maintain a body of gas in the chamber above the liquid, said check valve means being loaded sufficiently lightly to maintain the liquid level in the chamber at all times above said location.

8. A well pump filter device comprising a tubular body containing a vertically extending chamber and adapted to be carried beneath a well pump, said body containing an inlet admitting liquid and gaseous well fluid into a lower portion of the chamber, a mobile mass of interengaging filter particles in the path of fluid flow through the chamber and displaceable by the fluid, said particles acting to separate gases from the well liquid and control the passage of sand through the chamber, a liquid outlet tube extending downwardly into said chamber from the upper end thereof, said tube containing a liquid discharge passage leading to said pump and communicating with the chamber at a predetermined location spaced beneath the top of the chamber, the wall of said tube being imperforate above said location, gas outlet means for separately discharging gases from an upper portion of the chamber above said location to the outside of the body, and check valve means preventing fluid inflow through said outlet means and resisting the gas discharge to maintain a body of gas in the chamber above the liquid, said check valve means being loaded sufficiently lightly to maintain the liquid level in the chamber at all times above said location.

9. A well pump filter device comprising a tubular body containing a vertically extending chamber and adapted to be carried beneath a well pump, a mobile and vertically displaceable mass of interengaging glass spheres in said chamber, said body containing an inlet positioned to direct liquid and gaseous well fluid in a circular and upwardly spiraling course of flow within the chamber and to cause by the flow a corresponding upwardly spiraling displacement of the spheres, a liquid outlet tube extending downwardly into said chamber from the upper end thereof, said tube containing a liquid discharge passage leading to said pump and communicating with the chamber at a predetermined location spaced beneath the top of the chamber, the wall of said tube being imperforate above said location, said liquid outlet tube terminating downwardly in a tapered and closed lower end located above the mass of spheres in their condition of repose, gas outlet means for separately discharging gases from an upper portion of the chamber above said location to the outside of the body, and check valve means preventing fluid inflow through said outlet means and resisting the gas discharge to maintain a body of gas in the chamber above the liquid, said check valve means being loaded sufficiently lightly to maintain the liquid level in the chamber at all times above said location.

NORMAN C. WELLS.

References Cited in the file of this patent

UNITED STATES PATENTS

| Number | Name | Date |
|---|---|---|
| 1,478,427 | Dulaney | Dec. 25, 1923 |
| 1,554,835 | Barrett | Sept. 22, 1925 |
| 1,573,051 | Gignoux et al. | Feb. 16, 1926 |
| 1,578,720 | Derby | Mar. 30, 1926 |
| 1,628,900 | Nielsen | May 17, 1927 |
| 2,525,897 | Greene | Oct. 17, 1950 |